(12) United States Patent
Coogan et al.

(10) Patent No.: US 9,658,607 B2
(45) Date of Patent: May 23, 2017

(54) SYSTEM, METHOD AND APPARATUS FOR GROUPING BUILDING AUTOMATION OBJECTS FOR GROUP COMMUNICATION WITHIN A BUILDING AUTOMATION SYSTEM

(71) Applicants: James J. Coogan, Buffalo Grove, IL (US); William Choi, Lake Zurich, IL (US); Gerhard Brun, Lucerne (CH)

(72) Inventors: James J. Coogan, Buffalo Grove, IL (US); William Choi, Lake Zurich, IL (US); Gerhard Brun, Lucerne (CH)

(73) Assignee: Siemens Schweiz AG, Zurich (CH)

( * ) Notice: Subject to any disclaimer, the term of this patent is extended or adjusted under 35 U.S.C. 154(b) by 646 days.

(21) Appl. No.: 13/851,695

(22) Filed: Mar. 27, 2013

(65) Prior Publication Data

US 2013/0218349 A1    Aug. 22, 2013

Related U.S. Application Data

(63) Continuation-in-part of application No. 13/573,669, filed on Oct. 3, 2012, now Pat. No. 9,519,276.
(Continued)

(30) Foreign Application Priority Data

Oct. 3, 2011  (EP) ..................................... 11183684

(51) Int. Cl.
*G06F 9/45* (2006.01)
*G05B 13/02* (2006.01)
(Continued)

(52) U.S. Cl.
CPC ............. *G05B 13/02* (2013.01); *G05B 15/02* (2013.01); *G06F 8/34* (2013.01); *G05B 2219/23255* (2013.01); *G05B 2219/2642* (2013.01)

(58) Field of Classification Search
CPC .. G05B 2219/23255; G05B 2219/2642; G06F 8/24; G06F 8/34
(Continued)

(56) References Cited

U.S. PATENT DOCUMENTS 6,028,998 A *  2/2000  Gloudeman ........... G05B 15/02
                                                         717/108
7,734,572 B2 *  6/2010  Wiemeyer .............. G05B 15/02
                                                         700/19
(Continued)

FOREIGN PATENT DOCUMENTS

CN      1183860 A      6/1998
CN      1476585 A      2/2004
(Continued)

OTHER PUBLICATIONS

Chinese Office Action dated Dec. 18, 2015, for CN Application No. 201380016825.6, 10 pages.
(Continued)

*Primary Examiner* — Aniss Chad

(57) ABSTRACT

A system is provided for communicating common data associated with building automation objects between building automation devices across a network. The common data corresponds to a group of one or more building automation objects representing points associated with a plurality of field devices controlled or monitored in a building by the building automation devices. The system comprises a first building automation device having a group master object that includes a group identifier. A second building automation device includes a group member object having the same
(Continued)

group identifier as the group master object. The group master object exchanges the common data to each of the building automation devices having a group member object that has the same group identifier as the group master object.

24 Claims, 8 Drawing Sheets

Related U.S. Application Data

(60) Provisional application No. 61/617,008, filed on Mar. 28, 2012, provisional application No. 61/617,020, filed on Mar. 28, 2012.

(51) Int. Cl.
*G05B 15/02* (2006.01)
*G06F 9/44* (2006.01)

(58) Field of Classification Search
USPC .......................................................... 703/22
See application file for complete search history.

(56) References Cited

U.S. PATENT DOCUMENTS

| | | | |
|---|---|---|---|
| 8,516,016 B2* | 8/2013 | Park | G06F 9/541 |
| | | | 707/809 |
| 9,065,672 B2* | 6/2015 | Nielsen | H04L 12/2821 |
| 2005/0289467 A1* | 12/2005 | Imhof | G05B 15/02 |
| | | | 715/734 |
| 2007/0055759 A1* | 3/2007 | McCoy | G05B 19/042 |
| | | | 709/223 |
| 2007/0233323 A1 | 10/2007 | Wiemeyer et al. | |
| 2010/0257295 A1 | 10/2010 | Nielsen | |
| 2011/0087650 A1* | 4/2011 | Mackay | G05B 15/02 |
| | | | 707/722 |

FOREIGN PATENT DOCUMENTS

| | | |
|---|---|---|
| CN | 1526108 A | 9/2004 |
| CN | 1639517 A | 7/2005 |
| CN | 1898615 A | 1/2007 |
| CN | 101344956 A | 1/2009 |

OTHER PUBLICATIONS

PCT Search Report dated Aug. 27, 2013, for Application No. PCT/EP2013/056734, 11 pages.
Chinese office action dated Nov. 14, 2016, for CN Application No. 201380016825.6, 12 pages.

* cited by examiner

SYSTEM, METHOD AND APPARATUS FOR GROUPING BUILDING AUTOMATION OBJECTS FOR GROUP COMMUNICATION WITHIN A BUILDING AUTOMATION SYSTEM

CROSS REFERENCE TO RELATED APPLICATIONS

This patent application is a continuation-in-part of and claims the benefit of U.S. patent application Ser. No. 13/573,669, titled "Structure And Behavior Of A Building Automation System" filed Oct. 3, 2012, which claims the benefit of EP11183684, filed Oct. 3, 2011, the disclosure of each of which is incorporated herein in its entirety by reference.

This patent application further claims priority under 35 U.S.C. §119(e) and all other benefits permitted by law from (1) U.S. Provisional Patent Application No. 61/617,008, titled "System, Method and Apparatus for Grouping Building Automation Objects for Group Communication Within a Building Automation System" filed Mar. 28, 2012, and from (2) U.S. Provisional Patent Application No. 61/617,020, titled "System and Method for Grouping Building Automation Objects for Group Communication for a Central Control Application Within a Building Automation System" also filed Mar. 28, 2012.

The subject matter of this application is additionally related to the subject matter in the following U.S. patent applications each by one or more of the same inventors as the present application and filed on the same day (Mar. 28, 2012) as the two above identified US Provisional Patent Applications Nos. 61/617,008 and 61/617,020 and commonly assigned herewith to Siemens AG:

Non-provisional, U.S. patent application Ser. No. 13/432,427, titled "Application-Generated Function Block For Data Exchange Between Control Programs And Building Automation Objects," filed on Mar. 28, 2012;

Non-provisional, U.S. patent application Ser. No. 13/432,417, titled "System And Method For Automatically Naming Objects In A Building Automation System," filed on Mar. 28, 2012; and Each of these additional related applications are incorporated herein by reference in its entirety to the extent permitted by law.

FIELD OF THE INVENTION

The present invention generally relates to building systems and, more particularly, to systems, methods and field panel apparatus for grouping building automation objects (such as monitored and/or controlled points within a building automation system such as inputs and outputs of field devices) for group communication with building automation devices (including between field panel controllers and field devices) within the building automation system.

BACKGROUND OF THE INVENTION

A building automation system is an arrangement for monitoring, open-loop control and/or closed-loop control of process variables in complex technical systems in a building, or in a campus comprising a number of buildings. A building automation system typically operates heating, ventilation and air-conditioning systems, lighting and shading devices and also access control, security and fire surveillance systems. In the building automation system, process variables—such as room air conditioning variables or events, for example—are detected, evaluated, monitored, influenced or generated, with the energy consumption of the building or campus also advantageously being optimized by the building automation system.

Generally, a building automation system encompasses and operates a plurality of field devices, such as sensors and actuators. Examples of typical field devices are temperature and humidity sensors, air quality sensors, pressure sensors, flow meters, electricity meters, heat meters, brightness sensors, fire alarms, intrusion alarms, alarm or sprinkler devices, drives for hot water valves, thermostat valves, ventilation flaps or blinds, light switches, smart card readers or devices for detecting biometric data. The building automation system typically comprises a plurality of software modules, processes or programs, and in general, a number of computers or processors for their activation and also as a rule a plurality of open-loop and closed-loop control devices as well as further devices, for example devices for linking the building automation system to external communication networks and graphical user interfaces having screens for viewing and analysis of captured signals, video and data from monitored and/or controlled points or elements within the building automation system.

The points or elements (building automation objects or field devices) of a building automation system are widely dispersed throughout a facility. For example, an HVAC system includes temperature sensors and ventilation damper controls as well as other elements that are located in virtually every area of a facility. Similarly, a security system may have intrusion detection, motion sensors and alarm actuators dispersed throughout an entire building or campus. Likewise, fire safety systems include smoke alarms and pull stations dispersed throughout the facility. To achieve efficient and effective building automation system operation, there is a need to monitor the operation of, and often communicate with, the various dispersed points or elements of a building automation system.

Electrical or wireless communication media are used in a building automation system for the exchange of data of individual devices or parts of systems, as a rule a number of communication networks exist, with cables, optical data communication channels, ultrasound connections, electromagnetic near fields or radio networks able to be used, including fiber optic networks or cellular networks for example. Examples of technologies or standards able to be used for the said data exchange are BACnet, LON or LonWorks® from the company ECHELON, the European Installation bus EIB, KONNEX, ZigBee or PROFIBUS defined by German standard DIN 19245. BACnet refers to the ANSI/ASHRAE 135-2008 building communication protocol standard, titled "BACnet, A Data Communication Protocol For Building Automation And Control Networks" (2008).

Building automation systems typically have one or more centralized control stations in which data from each of the points or elements in the system may be monitored and in which various aspects of system operation may be controlled and/or monitored. The control station typically includes a computer having processing equipment, data storage equipment, and a user interface. To allow for monitoring and control of the dispersed control system points or elements, building automation systems often employ multi-level communication networks to communicate operational and/or alarm information between operating elements, such as sensors and actuators, and the centralized control station.

One example of a building automation system control station is the APOGEE® INSIGHT® Workstation, available from Siemens Industry, Inc. of Buffalo Grove, Ill., which may be used with the model APOGEE® building automation system, also available from Siemens Industry, Inc. (APOGEE and INSIGHT are U.S. federally registered trademarks of Siemens Industry, Inc.) In this system, several control stations, connected via an Ethernet or another type of network, may be distributed throughout one or more building locations, each having the ability to monitor and control system operation. As a consequence, different people in different locations of the facility may monitor and control building operations.

The typical building automation system (including those utilizing the APOGEE® Insight® Workstation) has a plurality of field panels and/or controllers that are in communication with a workstation. In addition, the building automation system also includes one or more field devices connected to the field panels and/or controllers. Each field device is typically operative to measure and/or monitor various building automation system parameters. In particular, each field device may include one or more sensors and/or actuators to measure and/or monitor corresponding "points" within the respective building and/or building automation system, As referenced herein, a "point" may be (i) any physical input or output to or from a respective controller, field device, sensor or actuator, or (ii) any virtual point associated with a control application or logic object within a controller or field panel that is measured, monitored or controlled.

While the workstation is generally used to make modifications and/or changes to one or more of the various components of the building automation system, a field panel may also be operative to enable certain modifications and/or changes to one or more parameters of the system. This typically includes parameters such as a temperature set point or other set points in a field device controller or directly in a field device. In addition, the workstation may be configured to modify a control program or the like in a field panel for controlling a field device.

To this end, addressing of virtual or physical points of field devices within a building automation system is typically defined directly in a closed-loop or open-loop control program residing in a field panel controller or other building automation device that needs to control and/or monitor such points. For example, for points corresponding to field devices connected to a field panel controller over a BACnet network, the input, output and value of the field device or point is typically defined or modeled as a BACnet object that is addressed directly by a control program or application in the respective field panel controller. Conventional building automation systems with such an object-oriented software structure is described in patent application serial numbers WO99/39276A and WO99/60487A.

However, if a number of identical or similar control programs or applications are present in a single or multiple field panel controllers within a building automation system (for example, a number of room temperature closed-loop control programs in separate field panel controllers), the individual control programs or applications must each be adapted to include separately addressable point or BACnet objects for separate communication with the field devices that are associated with the respective point or BACnet object residing on the respective field panel controller. In addition, determining how field devices are related in the building automation system is often times difficult and inefficient given the sheer number of field devices typically present in large business automation systems. Moreover, control programs when written are customized for the specific number of inputs of field devices making the process inefficient for adding additional field device inputs or outputs (or points) when a field technician is engineering, setting up, configuring or commissioning control programs and applications for field panel controllers deployed to interface and communicate with the various field devices within the building automation system.

There is a need, therefore, for a system, process and apparatus or mechanism for grouping building automation objects corresponding to field devices employed in a building automation system, and particularly in and between field panel controllers employed therein, to provide efficient group communication between control programs of the respective field panel controllers and the field devices.

SUMMARY OF THE INVENTION

Embodiments of the invention address the above-identified shortcomings of the prior art for addressing and communicating with points or building automation objects defined within multiple building automation devices (such as field panel controllers) by employing grouping systems, methods and apparatus as described herein to facilitate efficient deployment and operational communication between common control functions of control programs in multiple field panel controllers and corresponding field devices within the building automation system.

In accordance with systems, methods and apparatus described herein, a first embodiment of a system for communicating common data between a plurality of building automation devices across a network is provided. The common data is associated with a group of one or more building automation objects representing points associated with a plurality of field devices controlled or monitored in a building by the building automation devices. In this embodiment, the system comprises a first of the building automation devices that includes a first control program and a group master object having a group identifier and operatively configured to receive a command from the first control program. The system further comprises a second building automation device that includes a second control program and a group member object having the same group category identifier as the group master object. The group master object is operatively configured to, in response to receiving the command from the first control program, exchange the common data corresponding to the group of the building automation objects to each of the building automation devices having a group member object that has the same group category identifier as the group master object.

In a second embodiment, the group identifier is a group category identifier and the group master object of the first building automation device further includes a group number identifier. In this embodiment, group master object is operatively configured to exchange the common data corresponding to the group of the building automation objects with each of the building automation devices having a group member object that has the same group category identifier and the same group number identifier as the group master object.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

BRIEF DESCRIPTION OF THE DRAWINGS

The embodiments will be further described in connection with the attached drawing figures. It is intended that the drawings included as a part of this specification be illustrative of the exemplary embodiments and should in no way be considered as a limitation on the scope of the invention. Indeed, the present disclosure specifically contemplates other embodiments not illustrated but intended to be included in the claims. Moreover, it is understood that the figures are not necessarily drawn to scale.

DETAILED DESCRIPTION

Figure 1:
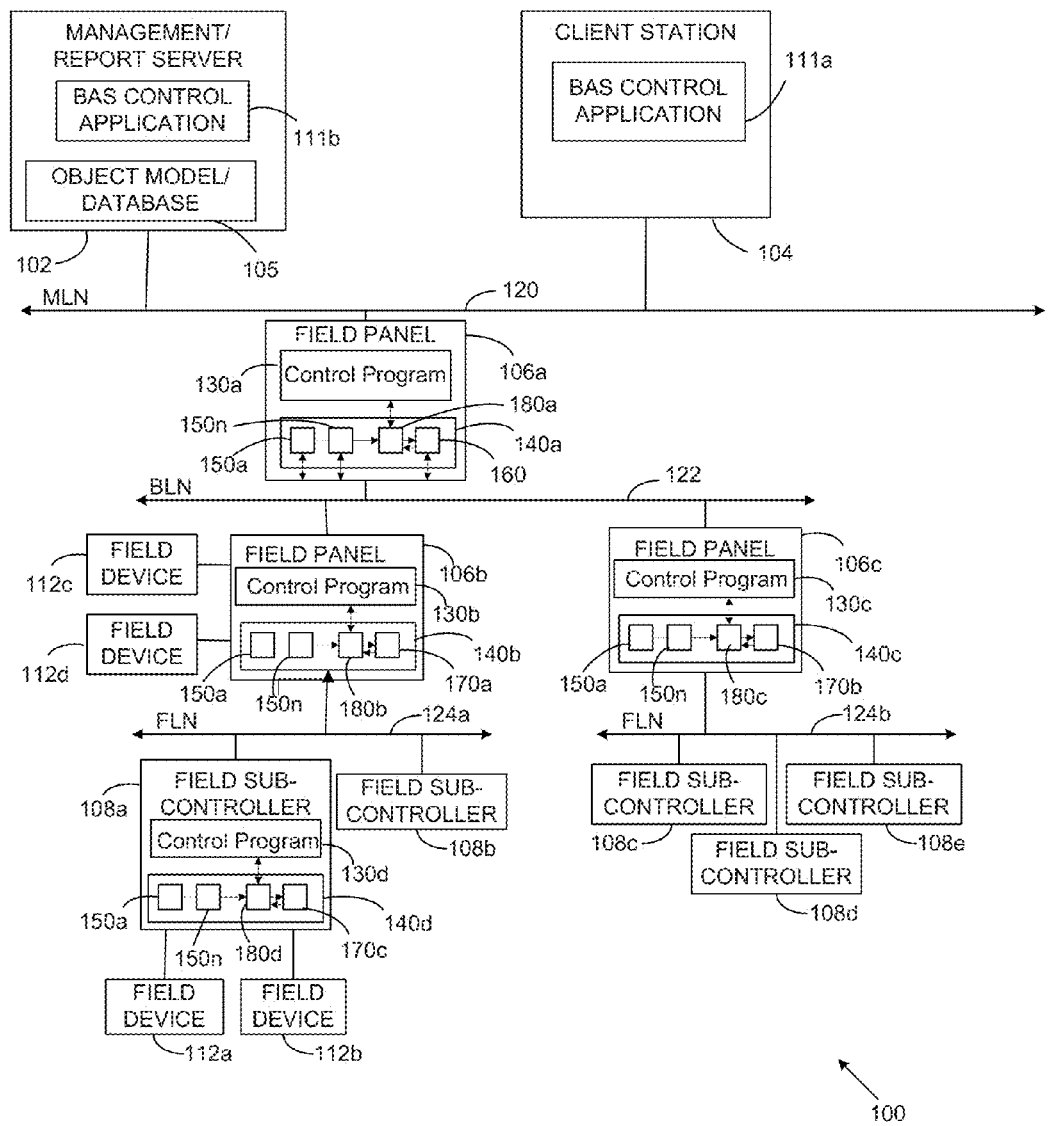
FIG. 1 shows a block diagram of an exemplary building automation system employing an embodiment of the present invention.

The exemplary embodiments provided in the figures and Appendix A and discussed below are illustrative. The present invention is not limited to those embodiments described herein, but rather, the disclosure includes all equivalents. The systems, processes, and methods can be used in any field benefiting from dynamic configurable controllers.

Unless otherwise defined, all technical and scientific terms used herein have the same meaning as commonly understood by one of ordinary skill in the art. In case of conflict, the present document, including definitions, will control. Preferred methods and materials are described below, although apparatuses, methods, and materials similar or equivalent to those described herein can be used in practice or testing. All publications, patent applications, patents and other references cited herein are incorporated by reference in their entirety to the extent permitted by law. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not. In addition, the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

A more detailed description of the embodiments will now be given with reference to the Figures. Throughout the disclosure, like reference numerals and letters refer to like elements. The present disclosure is not limited to the embodiments illustrated; to the contrary, the present disclosure specifically contemplates other embodiments not illustrated but intended to be included in the claims Turning to FIG. 1, a block diagram is shown of an exemplary building automation system (BAS) 100 in which the subject invention may be employed. The building automation system 100 is depicted as a distributed building system that provides control functions for any one of a plurality of building operations. Building automation systems may thus include HVAC systems, security systems, life or fire safety systems, industrial control systems, lighting systems, window blinds and/or awning control systems, and/or the like. An example of a BAS is the APOGEE® system commercially available from Siemens Industry, Inc. of Buffalo Grove, Ill. and the DESIGO® system commercially available from Siemens Schweiz AG. Of Zug, Switzerland. The APOGEE® system and the DESIGO® system each allows the setting and/or changing of various controls of the system, generally as provided below. It should be appreciated that the building automation system 100 is only an exemplary form or configuration for a building automation system. Therefore, the principles and embodiments of the subject invention described herein are applicable to other configurations and/or forms of building automation systems besides the APOGEE® system and the DESIGO® system.

The building automation system 100 may include at least one supervisory control system or workstation 102 (also referenced as a BAS management and/or report server), any number of client workstations 104 (only one is shown in FIG. 1), a plurality of field panels represented by field panels 106a, 106b and 106c, a plurality of field panel sub-controllers represented by controllers 108a-108e, and a plurality of field devices 112a-d. Although illustrated with one client stations 104, three field panels 106a-106c, five field controllers 108a-108e and four field devices 112a-112d, it will be understood that the system 100 may comprise any suitable number of any of these components 102, 104, 106, 108 and 112 based on the particular configuration for a particular building. The field panels 106 and sub-controllers 108 are also each referenced herein as a "building automation device".

In the implementation shown in FIG. 1, the field panel 106a may comprise a computer, a general-purpose data processing system, or BAS controller such as a PXC programmable controller commercially available from Siemens Industry, Inc. or Siemens Schweiz AG (collectively "Siemens"). The field panel 106a is configured to provide overall control and monitoring of the automation system 100 in accordance with any commands that may be received from the BAS management/report server 102. The field panel 106a may operate as a data server that is capable of exchanging data with various elements of the automation system 100. As such, the field panel 106a may allow access to system data by various applications that may be executed on the field panel 106a or other supervisory computers such as BAS management/report server 102 or client workstation 104.

For example, the field panel 106a may be capable of communicating with other supervisory computers, Internet gateways, or other gateways to other external devices, as well as to additional network managers (which in turn may connect to more subsystems via additional low-level data networks) by way of a management level network (MLN) 120. The field panel 106a may use the MLN 120 to exchange system data with other elements on the MLN 120, such as the BAS management/report server 102 and one or more client stations 104. The MLN 120 may comprise an Ethernet or similar wired network and may employ TCP/IP, BACnet and/or other protocols that support high-speed data communications. In some embodiments, the field panel 106a may function as a router enabling communication between various components in MLN 102 and BLN 122. For example, automation system 100 may have a hierarchy of field panels on which field panel 106a may route information to and from field panels 106b-106c.

The BAS management/report server 102 may be configured to generate reports regarding various aspects of the automation system 100. In various embodiments, the BAS management/report server 102 includes an object model or database 105. The database 105 stores information regarding devices within automation system 100. For example, the database 105 may maintain a list of device identifiers and routing numbers of devices present within automation system 100. Devices in the automation system 100, for example client stations 104, may access the database 105 to identify other devices, for example field devices 112, that are controlled and/or monitored within the automation system 100. Additionally, the database 105 may store point values for points corresponding to inputs and outputs of field devices 112 or other points in the building that are monitored and/or controlled within the automation system 100. For example, the BAS management/report server 102 may receive point values from the field panels 106 and/or the field sub-controllers 108 and store the received point values in the database 105. Such points may be modeled by BA objects that are stored and managed in groups in the field panels 106 and/or sub-controllers as discussed in further detail below. To conserve network and/or storage resources, the BAS management/report server 102 may receive new values for the point variables periodically. For example, the BAS management/report server 102 may receive new values at predetermined intervals. In another example, BAS management/report server 102 may receive new values when a certain amount of change in a point value occurs (e.g., change of value (COV)).

Each client station 104 may be configured to communicate with the automation system 100 to receive information from and/or provide modifications to the automation system 100 in any suitable manner. For example, client stations 104 may be computers or data processing systems. In these illustrative embodiments, client stations 104 and BAS management/report server 102 provide BAS control applications 111a-b, respectively. BAS control applications 111 are software applications that allow a user to create, modify, and/or delete a program code for a control program. For example, BAS control applications 111 may allow a user to create, modify, and/or delete a program code for a control program 130a-130d for any one of field panels 106a-106c and field sub-controllers 108a-108e in automation system 100. In some embodiments, client stations 104 and BAS management/report server 102 implement as the BAS control application 111 one or more Insight® workstation applications available from Siemens. Insight® workstation is an application that provides a graphical interface for building management and control operations.

The field panel 106a may also be configured to accept modifications and/or other input from a user such as a field engineer using an engineering tool for configuring and commissioning the field panel 106a. This may be accomplished via a user interface of the field panel 106a or any other user interface that may be configured to communicate with the field panel 106a through any suitable network or human-machine interface (HMI) connection. The user interface may include a keyboard, touchscreen, mouse, or other interface components. The field panel 106a is configured to, among other things, affect or change operational data of the field panels 106 (including BA object models as discussed in further detail herein), as well as other components of the automation system 100. The field panel 106a may use a building level network (BLN) 122 to exchange data (including common group data from an identified group of BA objects as discussed in detail herein) with other elements on the BLN 122, such as the other field panels 106b-106c and sub-controllers 108a-108e.

Each of the other field panels 106b-106c may also comprise a general-purpose processor and is configured to use the data and/or instructions from the field panel 106a to provide control of the respective field panel's one or more corresponding field controllers 108. While the field panel 106a is generally used to make modifications to one or more of the various components of the automation system 100 in the implementation shown in FIG. 1, field panel 106b or 106c may also be able to provide certain modifications to one or more parameters and BA objects of the automation system 100. Each field panel 106b-106c may use a field level network (FLN) 124 to exchange data (including common group data from an identified group of BA objects as discussed in detail herein) with other elements on the FLN 124, such as a subset of the field controllers 108a-108e coupled to the field panel 106a. In one embodiment, the other field panels 106b-106c may also be a PXC programmable controller available from Siemens.

Each field sub-controller 108a-108e may comprise a general-purpose processor and may correspond to one of a plurality of localized, standard building automation subsystems, such as building space temperature control subsystems, lighting control subsystems, or the like. For a particular embodiment, the field sub-controllers 108a-108e may comprise the model TEC (Terminal Equipment Controller) available from Siemens. However, it will be understood that the field sub-controllers 108a-108e may comprise any other suitable type of controllers without departing from the scope of the present invention.

To carry out control of its associated subsystem, each controller 108a-108e connects to one or more field devices 112, such as sensors and/or actuators, associated with a respective point in a room or area of the building. Each field sub-controller 108 is configured to use the data and/or instructions from its corresponding field panel 106 to provide control of its one or more corresponding field devices 112. For some embodiments, some of the field controllers 108 may control their subsystems based on sensed conditions and desired set point conditions. For these embodiments, these field controllers 108 may be configured to control the operation of one or more field devices 112 to attempt to bring the sensed condition to the desired set point condition. It is noted that in the automation system 100, information from the field devices 112 may be shared between the field controllers 108, the field panels 106b-106c, the field panel 106a and/or any other elements on or connected to the automation system 100.

In order to facilitate the sharing of information between subsystems, groups of subsystems may be organized into an FLN 124. For example, the subsystems corresponding to the field controllers 108a and 110b may be coupled to the field panel 106b to form the FLN 124a. The FLNs 124 may each comprise a low-level data network that may employ any suitable proprietary or open protocol.

Each field device 112 may be configured to measure, monitor, and/or control various parameters of the automation system 100. Examples of field devices 112 include lights, thermostats, temperature sensors, fans, damper actuators, heaters, chillers, alarms, HVAC devices, and numerous other types of field devices. The field devices 112 may be capable of receiving control signals from and/or sending signals to the field controllers 108 and/or the field panels 106a-106c of the automation system 100. Accordingly, the automation system 100 is able to control various aspects of building operation by controlling and monitoring the field devices 112.

As illustrated in FIG. 1, any of the field panels 106, such as the field panel 106a, may be directly coupled to one or more field devices 112, such as the field devices 112c and 112d. For this type of embodiment, the field panel 106b may be configured to provide direct control of the field devices 112c and 112d instead of control via one of the field controllers 108a or 110b. Therefore, for this embodiment, the functions of a field sub-controller 108 for one or more particular subsystems may be provided by a field panel 106b or 106c without the need for a field sub-controller 108.

In accordance with the present invention, field panels 106a-106b and sub-controllers 108a-108e may each include a control program 130a-130d and a building automation (BA) object model or database 140a-140d, which the control program 130a-130d of the respective field panel 106a-106b or sub-controllers 108a-108e is configured to access. Each BA object model or database 140a-140d may comprise one or more building automation objects 150a-150n (also referred to as BA objects) that model or function as a proxy for an input or an output of a field device or other point of the building that is monitored and/or controlled by the automation system 100.

Access to the building automation objects 150a-150n that corresponds to field devices 112 under the control of respective building automation device, such as field panels 106a-106c or sub-controllers 108a-108e, typically requires coordination by a central control function of one of the control programs 130a-130d employed in the building automation devices 106 and 108 employed in the building automation system. In particular, individual room automation and control by the building automation system 100 for a building or campus of buildings typically involves a large number of entities such as: rooms within the building (or "building spaces") requiring separate temperature sensors, HVAC equipment (such as radiators, chilled ceilings, VAV boxes, fan coils), blind actuators and/or lighting actuators. Central control functions implemented by the control programs of the business automation devices allow and support centrally controlling and coordinating a set of arbitrary entities, such as points or BS objects corresponding to the field devices located in proximity to the separate building rooms or spaces. Typical central control functions are: central occupancy control, central setpoint control, central hot and cold water coordination which is also referred to as supply chain optimization, central lighting control, and central blind control. To manage these many entities and to facilitate central control functions in accordance with one aspect of the present invention, a grouping mechanism is provided to organize these functions according to organizational, geographical, functional or cross-disciples aspects and enabling group collaboration, via common data exchange between the central control functions employed in the building automation devices and individual entities or field devices.

The grouping mechanism for each central control function comprises a group master object 160 employed in the BA object model or database 140a of the building automation device (for example, field panel 106a) that includes the control program that has or implements a given central control function (e.g., central setpoint control) for the building automation system 100. For each other building automation device 106b, 106c, and 108a-108e that controls points or BA objects 150a-150n corresponding to individual entities or field devices required to implement the respective central control function, the grouping mechanism for that central control function further includes a group member object 170a-170c to be employed in the BA object model or database 140b-140d of those other building automation devices 106b, 106c, and 108a-108e. Each of the group member objects 170a-170c are operatively configured to identify and connect to the respective group master object 160 across the network(s) 122, 124a and/or 124b in accordance with a power up process described herein.

To further implement the grouping mechanism for a respective central control function in accordance with one embodiment of the present invention, each BA object model or database 140a-140d also includes one or more overview nodes 180a-180n (also referred to as a view node object). Each view node object 180a-180n is linked to a corresponding group master object 160 or group member object 170a-170c and controls the respective control program's 130a-130d access to the BA objects 150a-150n identified by and linked to the view node object 180a-180n via the corresponding group master object 160 or group member object 170a-170c in accordance with the structure for representation of groups and the grouping communication process discussed in detail below and in Appendix A. However, as described in further detail herein for certain embodiments, the group master object 160 may have access to BA objects 150a-150n (within the respective BA object model or database 140a-140d) that are used by the corresponding control program 130a without having to be linked to a view node object 180a for implementing group communication and common data exchange with group member objects 170a-170c for a respective central control function or program 130a. Likewise, in this embodiment, each group member object 170a-170c may have access directly to the corresponding BA objects 150a-150n located on the corresponding device 106b-106c for implementing group communication and common data exchange with the group master object 160.

Figure 2:
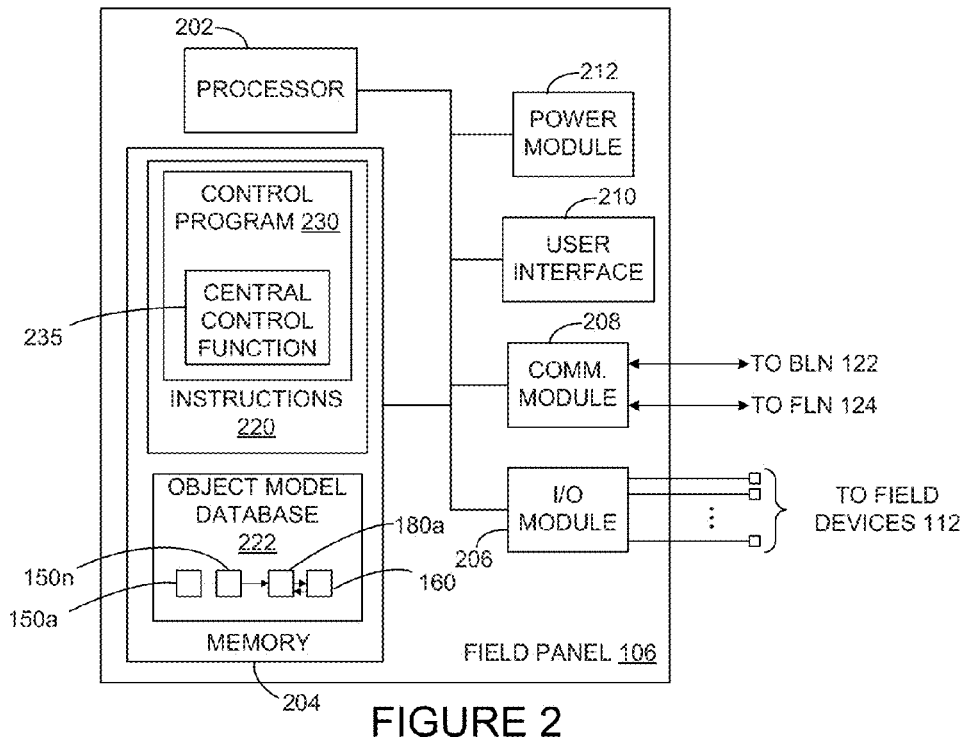
FIG. 2 illustrates an internal block diagram of an exemplary one of the field panels of the building automation system in FIG. 1 in accordance with disclosed embodiments.

Turning to FIG. 2, details of one of the field panels 106 having a control program 220 that includes or implements a central control function routine or application 235 is shown in accordance with the present disclosure. For the particular embodiment shown in FIG. 2, the field panel 106 comprises a processor 202, a memory 204, an input/output (I/O) module 206, a communication module 208, a user or HMI interface 210 and a power module 212. The memory 204 comprises any suitable data store capable of storing data, such as instructions 220 and an object model database 222. It will be understood by one of ordinary skill in the art having reviewed the present application that the field panel 106 may be implemented in any other suitable manner without departing from the scope of this disclosure.

In the example embodiment shown in FIG. 1, the field panel 106a is depicted as the field panel 106 having the control program 130a that corresponds to the control program 220 having a central control function 235. For this example, to illustrate the grouping mechanism of the present invention, the other field panels 106b and 106c may also have a similar structure as shown in FIG. 2 but, instead of having the central control function 235, the control program 220 of the other field panels 106b and 106c employ a cooperative or subordinate control function similar to the control function 335 employed in each field controller 108 as described below.

Continuing with FIG. 2, the processor 202 is configured to operate the field panel 106. Thus, the processor 202 may be coupled to the other components 204, 206, 208, 210, and 212 of the field panel 108. The processor 202 may be configured to execute program instructions or programming software or firmware stored in the instructions 220 of the memory 204, such as building automation device control program 230. In addition to storing the instructions 220, the memory 204 may also store other data for use by the automation system 100 in the database 222, such as various records and configuration files, graphical views, field device 112 identifiers and associated values, and/or other information. In particular, as previously noted, for each central control function 235 of the control program 230 employed by the field panel, the database 222 includes a corresponding group master object 160. The view node object 180a is operatively connected to the central control function 235 of the control program 230 and has a list of semantic information units that each identify and is linked to a corresponding one of a group of the building automation objects 150a-150n that may be needed by the central control function 235 and are to be communicated to other building automation devices 106b, 106c, and 108a-108e that are members of the group that are collectively required to implement the central control function (e.g., to perform central setpoint control, central HVAC control, central lighting control, central blind control, some combination thereof, or other central control function for the building automation system 100).

As described in further detail below, the group master object 160 has a group category identifier and a group number identifier. The category identifier is used to differentiate groups between independent application or control program domains such as setpoint control groups, occupancy driven control groups, and lighting control groups. The group number identifier may be used to identify a particular group within all groups or within a group category such as a setpoint group 1 and 2 or lighting groups 3, 6 and 7. The group master object 160 may be operatively connected to the view node object 180a; and is operatively configured to exchange common data corresponding to the group of the building automation objects 150a-150n identified by and linked to the view node object 180a to each of the building automation devices 106b, 106c, and 108a-108e having a group member object 170 that has the same group category identifier and the same group number as the group master object 160. In one embodiment, the group master object 160 may have the same or corresponding list of semantic information units as the view node object 180a that identify the corresponding group of the building automation objects 150a-150n that may be needed by the central control function 235 and are to be communicated to other building automation devices 106b, 106c, and 108a-108e that includes a group member object 170 having the same group category identifier and/or the same group number as the group master object 160 in order to collectively implement the central control function (e.g., to perform central setpoint control, central HVAC control, central lighting control, central blind control, some combination thereof, or other central control function for the building automation system 100).

If a point value corresponding to a BA object 150a or 150n that is linked to the view node object 180a and associated with a field device 112 under the control of another building automation device 106b-106c or 108a-108e that is not maintained in database 222 or monitored by the field panel 106a, the group master object 160 collects the point value of the respective BA object from another member device that is identified as a group member that directly controls or monitors the requested point value of the BA object corresponding to the applicable field device. The group master object 160 may then broadcast the common data corresponding to the group of the building automation objects 150a-150n identified by and linked to the view node object 180a to each of the building automation devices 106b, 106c, and 108a-108e in accordance with a pre-determined heartbeat interval.

Execution of the control program 230 by the processor 202 may result in control signals being sent to any field devices 112 that may be coupled to the field panel 108 via the group master object 160 in communication with the I/O module 206 of the field panel 106. Execution of the control program 230 may also result in the processor 202 receiving or collecting status signals and/or other data signals from field devices 112 coupled to the field panel 106 via the group master object 160 in communication with the I/O module 206 and subsequent storage of associated point or BA object data in the memory 204 or database 222.

The I/O module 206 may comprise one or more input/output circuits that are configured to communicate directly with field devices 112. Thus, for some embodiments, the I/O module 206 comprises analog input circuitry for receiving analog signals and analog output circuitry for providing analog signals.

The communication module 208 is configured to provide communication with the field panel 106a, other field panels 106b and 106c and other components on the BLN 122. The communication module 208 is also configured to provide communication to the field controllers 108, as well as other components on the FLN 124 that is associated with the field panel 106. Thus, the communication module 208 may comprise a first port that may be coupled to the BLN 122 and a second port that may be coupled to the FLN 124. Each of the ports may include an RS-485 standard port circuit or other suitable port circuitry.

The field panel 106 may be capable of being accessed locally via the interactive user interface 210. A user may control the collection of data from field devices 112 through the user interface 210. The user interface 210 of the field panel 106 may include devices that display data and receive input data. These devices may be permanently affixed to the field panel 106 or portable and moveable. For some embodiments, the user interface 210 may comprise an LCD-type screen or the like and a keypad. The user interface 210 may be configured to configure, commission, alter and show information regarding the field panel 106, such as status information and/or other data pertaining to the operation of, function of and/or modifications to the field panel 106.

The power module 212 may be configured to supply power to the components of the field panel 106. The power module 212 may operate on standard 120 volt AC electricity, other AC voltages or DC power supplied by a battery or batteries.

Figure 4:
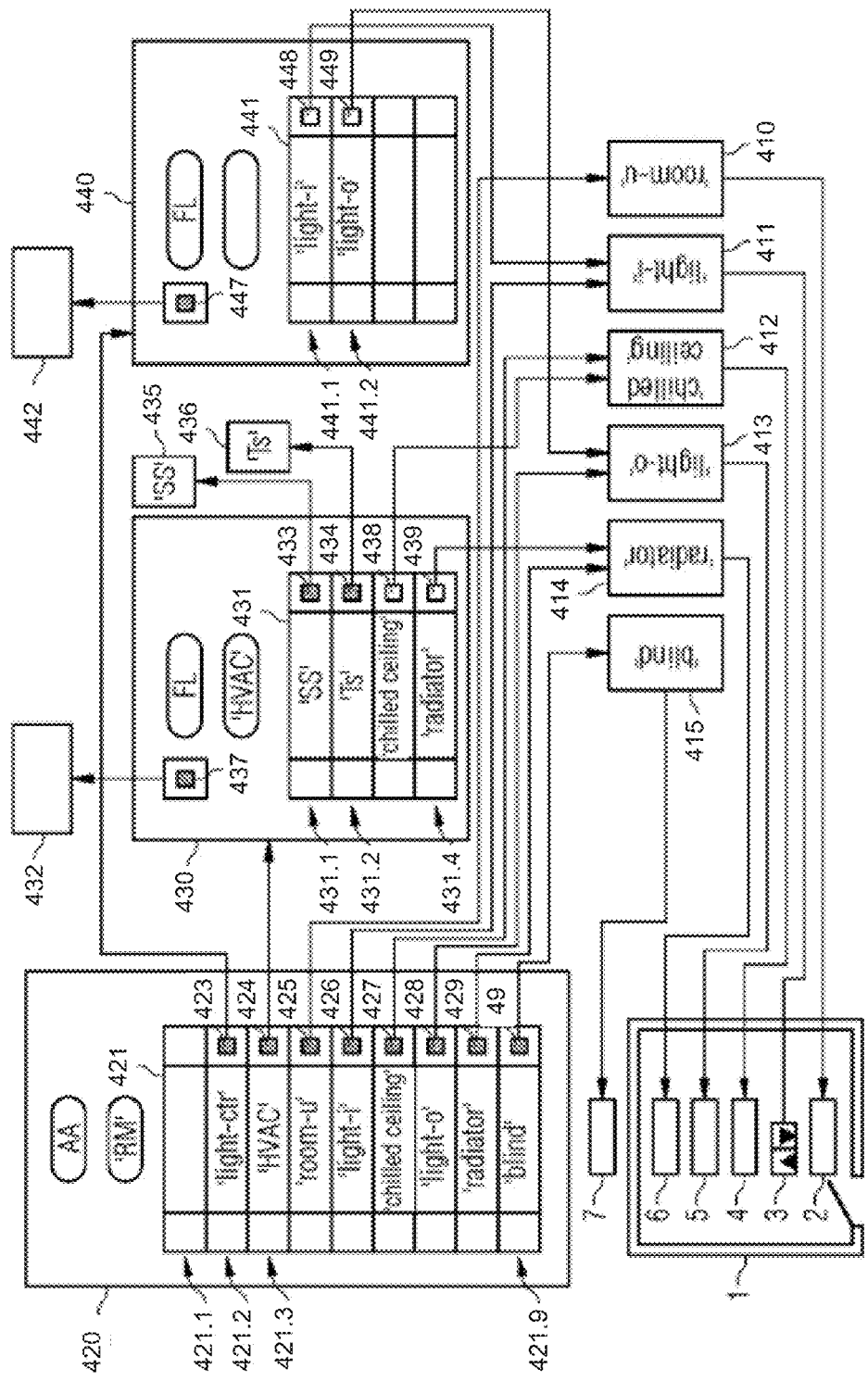
FIG. 4 illustrates a block diagram of an embodiment of a structure of the building automation system in FIG. 1 for modeling and operating field devices within a section of a building.

FIG. 4 illustrates details of one of the field sub-controllers 108 that may also be one of the building automation devices that collectively implement the grouping architecture and communication in accordance with the present disclosure. For this particular embodiment, the field sub-controller 108 comprises a processor 302, a memory 304, an input/output (I/O) module 306, a communication module 308 and a power module 312. For some embodiments, the field sub-controller 108 may also comprise a user interface (not shown in FIG. 4) that is configured to configure, commission, alter and/or show information regarding the field sub-controller 108. The memory 304 comprises any suitable data store capable of storing data, such as instructions 320 and a database 322. It will be understood that the field sub-controller 108 may be implemented in any other suitable manner without departing from the scope of this disclosure. For some embodiments, the field sub-controller 108 may be positioned in, or in close proximity to, a room of the building where temperature or another environmental parameter associated with the subsystem may be controlled with the field sub-controller 108.

The processor 302 is configured to operate the field sub-controller 108. Thus, the processor 302 may be coupled to the other components 304, 306, 308 and 312 of the field sub-controller 108. The processor 302 may be configured to execute program instructions or programming software or firmware stored in the instructions 320 of the memory 304, such as subsystem control program 330. For a particular example, the subsystem control program 330 may comprise a temperature control function 335 that is configured to control and process data from all components of a temperature control subsystem, such as a temperature sensor, a damper actuator, fans, and various other field devices under the control of the sub-controller 108. In addition to storing the instructions 320, the memory 304 may also store other data for use by the subsystem in the database 322, such as various configuration files, field device 112 identifiers and associated point values monitored and/or controlled by the field devices 112, and/or other information. In particular, as previously noted, for each subsystem control function 335 of the control program 330 employed by the sub-controller 108 or other field panels 106b-106c that are identified as members of a group for supporting a central control function 235, the database 222 of such group member sub-controllers 108 or field panels 106b-106c includes a corresponding a group member object 170 and a view node object 180b that is operatively connected to the control function 335 of the control program 330. The view node object 180b has a list of semantic information units that each identify and is linked to a corresponding one of a group of the building automation objects 150a-150n that may be needed by the control function 235 and are to be communicated to the group master object 160 of the building automation device 106a hosting the applicable central control function 235. As further explained herein, a group master object 160 may also have the same or corresponding list of semantic information units or tags that each identify the group of building automation objects 150a-150h that are to be communicated to or have corresponding common data to be exchanged with group member objects 170a-170b hosted on other devices 106b-106c or 108a-108d where the group member 170a-170b has the same group number and/or same group category as the group master object 160.

Execution of the control program 330 by the processor 302 may result in control signals being sent to any field devices 112 that may be coupled to the field sub-controller 108 via the group member object in communication with the I/O module 306 of the field sub-controller 108. Execution of the subsystem application 330 may also result in the processor 302 receiving status signals and/or other data signals from field devices 112 coupled to the field sub-controller 108 via the group member object 180b and subsequent storage of associated data in the memory 304 or within the BA objects 150a-150n in the database 322.

The I/O module 306 may comprise one or more input/output circuits that are configured to communicate directly with field devices 112. Thus, for some embodiments, the I/O module 306 comprises analog input circuitry for receiving analog signals and analog output circuitry for providing analog signals.

The communication module 308 is configured to provide communication with the field panel 106 corresponding to the field sub-controller 108 and other components on the FLN 124, such as other field sub-controllers 108. Thus, the communication module 308 may comprise a port that may be coupled to the FLN 124. The port may include an RS-485 standard port circuit or other suitable port circuitry.

The power module 312 may be configured to supply power to the components of the field sub-controller 108. The power module 312 may operate on standard 120 volt AC electricity, other AC voltages, or DC power supplied by a battery or batteries.

Figure 5:
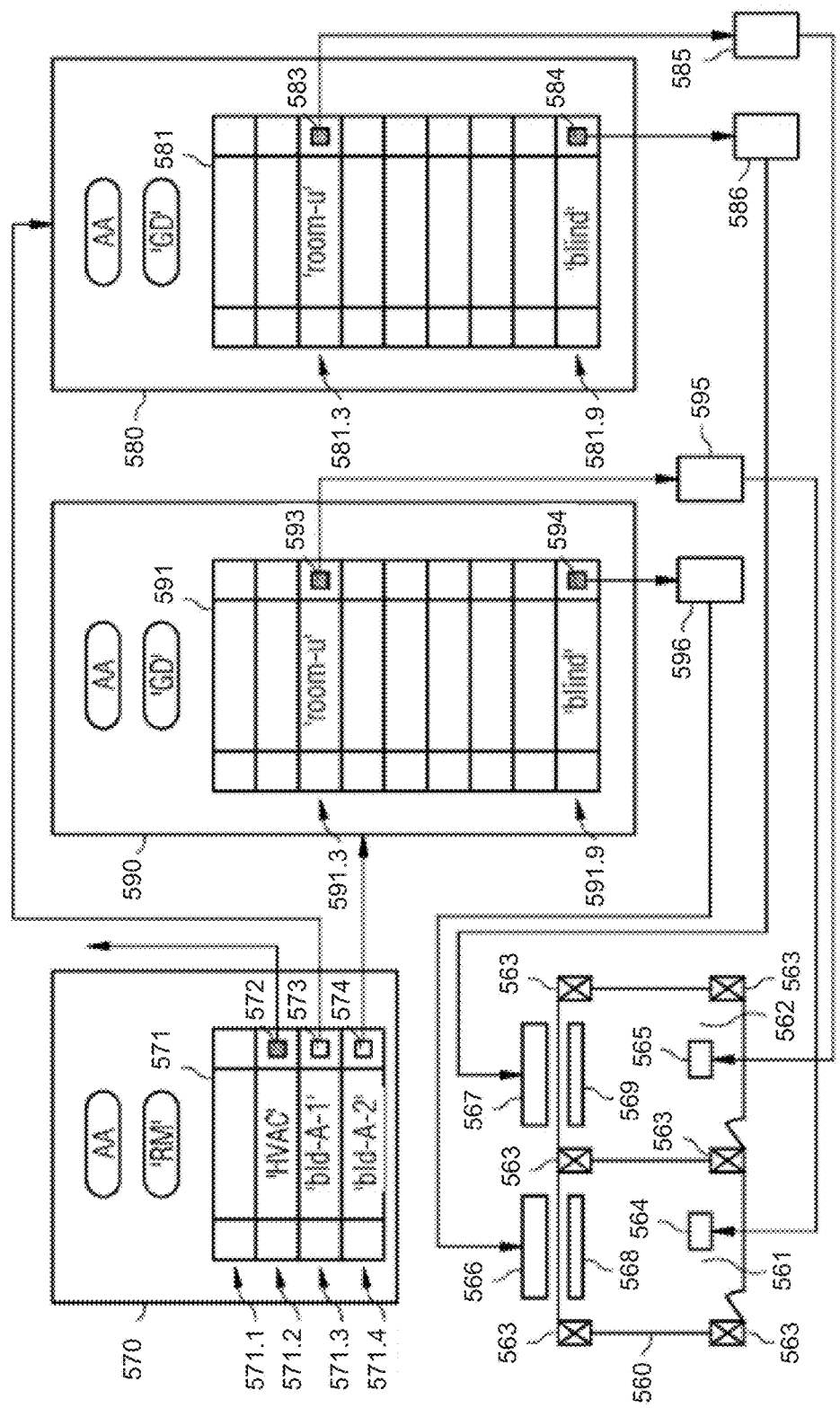
FIG. 5 illustrates a block diagram of another embodiment of a structure of the building automation system in FIG. 1 for modeling and operating field devices within another building section, having a number of rooms or zones, within the building automation system.

Turning now to FIGS. 4 and 5, details of view node objects 180 and relationship to control programs 130, 230 and 330 and applicable BA objects 150a-150n will be further explained. FIG. 4 illustrates a room 1 of a building section able to be operated by a building automation system. Assigned to the room 1 are a number of field devices, by the use of which for example a desired comfort for users and a required safety for users and infrastructure with optimized operating costs are able to be achieved. Typically assigned to the room 1 are a room unit 2, a light switch 3, an air conditioning register 4, a heating element 5, a heating register 6 and a blind drive 7 (each a field device 112), although other configurations are contemplated. The room unit 2 serves as the user interface to the building automation system, including but not limited to, to enter a nominal room temperature range and to display the current room temperature as well as to display an order of magnitude of the costs of the energy consumed by the room 1.

The devices operated in the room 1 are advantageously modeled as BA objects 150a-150n in the software of the building automation system as far as is necessary and corresponding models or objects are preferably implemented using an object-oriented approach. Typically the models are connected via input/output modules to field devices 112. For example the room unit 2 is mapped by a room unit model or BA object 410, the light switch 3 by a light switch model or BA object 411, the air conditioning register 4 by an air conditioning register model or BA object 412, the lighting element 5 by a lighting element model or BA object 413, the heating register 6 by a heating register model or BA object 414 and the blind drive 7 by a blind drive model or BA object 415 in the building automation system shown in FIG. 4.

An overview of the totality of the functionality of the automation functions available for the room 1 is stored in a first overview node 420 (also referred to as parent view node object). The first overview node 420 is an object of the building automation system and features an overview list (also referred to as a view node item list) 421, which has at least one semantic information unit. The semantic information unit identifies an automation function, which is provided in the room 1 represented by the first overview node 420. Advantageously the semantic information unit contains at least one identifier suitable for identification and a relation to the automation function involved. The name is advantageously a string data type with a fixed or variable length. A collection of semantic information units (also referred to a view node item list) may include a logically linked list of semantic information units to one or more parent or child nodes.

A specific relationship between two nodes or objects of the building automation system is designated in this text by the term relation such that they form one or more parent-child relationships. The relation has a predefined type range which comprises at least two different relation types. In the present case what is known as a contacts relation and what is known as "an owns" relation are defined or a logically linked/connected relationship. The contacts or connects relation is identical here to the relation with the value "contacts" or "connects" and means here that this relation is implemented such that the relation is suitable for a bidirectional data exchange between the nodes or objects concerned. The owns relation is identical here to the relation with the value "owns" and means here that this relation is implemented such that the relation is suitable one the one hand for a bidirectional data exchange between the nodes or objects concerned, on the other hand nodes or objects with the owns relation are advantageously existentially linked to one another such that they can only be copied, moved and deleted together, by an engineering tool for example.

In the present exemplary embodiment the overview list 421 has space for nine semantic information units 421.1 to 421.9 together forming a collection of semantic information units (also referred to as a view node item list).

A semantic information unit 421.3 able to be identified by the identifier "HVAC"—i.e. heating, ventilation and air conditioning—has an owns relation 424, which applies between the first overview node 420 (also referred to as a parent view node object) and a second overview node 430 (also referred to as a child view node object).

A semantic information unit 421.2 able to be identified by the identifier "light-ctr"—i.e. light control—has an owns relation 423, which applies between the first overview node 420 and a third overview node 440 (also referred to as a child view node object).

A semantic information unit 421.4 able to be identified by an identifier "room-u"—i.e. room unit—has an owns relation 425, which applies between the first overview node 420 and the room unit model or BA object 410.

A semantic information unit able to be identified by an identifier "light-i"—i.e. light input—has an owns relation 426, which applies between the first overview node 420 and the light switch model or BA object 411.

A semantic information unit able to be identified by an identifier "chilled ceiling" has an owns relation 427, which applies between the first overview node 420 and the air conditioning register model or BA object 412.

A semantic information unit able to be identified by an identifier "light-o"—i.e. light output—has an owns relation 428, which applies between the first overview node 420 and the illumination element model or BA object 413.

A semantic information unit able to be identified by an identifier "radiator" has an owns relation 429 which applies between the first overview node 420 and the air conditioning register model or BA object 414.

Finally a semantic information unit able to be identified by an identifier "blind" has its own relation 49, which applies between the first overview node 420 and the blind drive model or BA object 415.

An overview of an automation functionality designated "HVAC"—i.e. heating, ventilation and air conditioning, is stored in the second overview node 430. The second overview node 430 is an object of the building automation system and has an overview list 431 for storage of semantic information units 431.1 to 431.4 (also referred to as a view node item list).

A semantic information unit 431.1 able to be identified by an identifier "SS"—i.e. status—has an owns relation 433, which applies between the second overview node 430 and a first variable 435 advantageously implemented as an object, in which for example current information on the operating state of the automation functionality "HVAC" is able to be stored.

A semantic information unit 431.2 able to be identified by an identifier "Ts"—i.e. temperature setpoint value—has an owns relation 434, which applies between the second overview node 430 and a second variable 436 advantageously implemented as an object, in which for example the temperature setpoint value "Ts" applicable for the automation functionality "HVAC" is able to be stored.

A semantic information unit 431.3 able to be identified by an identifier "chilled ceiling" has a contacts relation 438, which applies between the second overview node 430 and the air conditioning register model or BA object 412.

A semantic information unit able to be identified by an identifier "radiator" has a contacts relation 439, which applies between the second overview node 430 and the heating register model or BA object 414.

The second overview node 430 has a further an owns relation 437, which applies between the second overview node 430 and an open-loop and/or closed-loop control program 432. The automation function required for heating, ventilation and air conditioning of the building section is programmed in the open-loop and/or closed-loop control program 432. The open-loop and/or closed-loop control program 432, the second overview node 430 and the further objects 435 and 436, linked by an owns relations to the overview node 430, form a functional unit through the said an owns relation 437. Through the action option of the available relations an access for reading and writing of data between the open-loop and/or closed-loop control program 432 on the one hand and objects connected via relations with the overview node 430 on the other hand is made possible indirectly via the overview node 430. The described structure of the functional unit makes it possible for field devices to be incorporated into and replaced in the building automation system without program code in the open-loop and/or closed-loop control program 432 concerned having to be adapted for this purpose.

An overview of an automation functionality designated by "light-ctrl"—i.e. light control—is stored in the third overview node 440. The third overview node 440 is an object of the building automation system and has an overview list 441 for storing semantic information units 441.1 to 441.4.

A semantic information unit 441.1 able to be identified by an identifier "light-i"—i.e. light input—has a contacts relation 438, which applies between the third overview node 440 and the light switch model 411.

A semantic information unit 441.2 able to be identified by an identifier "light-o"—i.e. light output—has a contacts relation 439, which applies between the third overview node 440 and the illumination element model 413.

The third overview node 440 has an owns relation 447, which applies between the third overview node 440 and an open-loop and/or closed-loop control program 442. The automation function required for light control in the assigned building section is programmed in the open-loop and/or closed-loop control program 442. The open-loop and/or closed-loop control program 442 and the third overview node 440 form one functional unit through the said owns relation 447. The opportunity of the available relations to have an effect makes possible access for reading and writing of data, between the open-loop and/or closed-loop control program 442 on the one hand and objects connected via relations with the third overview node 440 on the other hand, indirectly via the overview node 440. The described structure of the functional unit makes possible the inclusion and replacement of field devices into the building automation system, without program code in the open-loop and/or closed-loop control program 442 concerned having to be adapted for this purpose.

The semantic information units stored in the overview list 421, 431 or 441 are advantageously able to be identified via predefined or standardized designations. This enables operator views, for a control center or management system of the building automation system for example, to be generated in a user-friendly manner and with relatively little effort. By using predefined designations by means of the string data type for the semantic information units a currently-installed building automation system is able to be documented with relatively little effort.

In an embodiment variant of the overview node 420, 430 or 440, the overview list 421, 431 or 441 is ordered or sorted in accordance with certain rules.

Advantageously device models will be provided with a designation which is able to be evaluated on generation or checking of a relation. If for example, as shown in FIG. 4, the semantic information unit 421.9 of the overview list 421 1 assigned to the room 1 is identified by the character string "blind" and also the corresponding blind drive model 415 is marked with the same identifier, the generation or checking of the owns relation 49 will be simplified and able to be automated.

By using a marking with the data type character string or string in a device model, an automatic linkage of the device model to the associated function unit via the corresponding overview node is made possible without program code having to be modified in the assigned open-loop or closed loop control program.

In accordance with the structure of the building the building sections to be operated by the building automation system are typically divided into rooms with—under some circumstances—very different requirements, or by a grid with grid elements with similar or identical requirements. Overview nodes are advantageously used in advantageous modeling of rooms and grid elements. Grid elements are typically produced by an arrangement of support structures or window structures in the building section. Flexible modeling of the building is achieved by the use of two different types of overview node, a first type for a room and a second type for grid elements. Overview nodes of the type designed for a room are typically labeled "RM", i.e. room, in the drawing, overview nodes of the type designed for grid elements are labeled "GD", i.e. grid or grid element. The overview node 420 shown in FIG. 4 for room 1 is accordingly of type "RM". Overview nodes of type "GD" can be linked dynamically to an overview node of type "RM".

In FIG. 5 a building section divided into the grid is labeled 560, having a first grid element 562 and a second grid element 561. The grid structure of the building section 560 is provided here by support structures 563 for example. The devices assigned to the two grid elements 562 and 561 are reduced here to a minimum for the sake of simplification, since only the principle of the advantageous modeling is to be presented. Grid element 562 or 561 thus comprises a room unit 565 or 564, a heating register 569 or 568, and a blind drive 567 or 566.

The devices operating the grid element 562 or 561 are advantageously modeled in the software of the building automation system as far as necessary and corresponding models are advantageously implemented using an object-oriented approach. The models are typically connected via input/output modules to the field devices. For example the room unit 565 or 564 will be mapped by room unit model 585 or 595 respectively and the blind drive 567 or 566 by a blind drive model 586 or 596 respectively in the building automation system.

A fourth overview node (as referred to as a parent view node object) 570 of type "RM", i.e. room, describes the building section 560 which comprises the two grid elements 562 or 561 respectively. The fourth overview node 570 has an overview list 571 for storage of semantic information units 571.1, 571.2, 571.3 and 571.4 which may be logically linked to one or more child view node objects (such as child view node objects 580, 590). A semantic information unit 571.2 able to be identified by the identifier "HVAC"—i.e. heating, ventilation and air conditioning—has an owns relation 575, which is between the fourth overview node 570 and a functional unit is not shown in the diagram, through which for example the heating, ventilation and air conditioning functionality is guaranteed to the entire building section. Furthermore the overview list 571 comprises a semantic unit 571.3 able to be identified with the identifier "bld-A-1" and a semantic unit 571.4 able to be identified with the identifier "bld-A-2".

A current grid division of the building section 560 is stored by means of semantic information units of the overview list 571. The semantic information unit 571.3 has a contacts relation 573 which applies between the fourth overview node 570 describing the building section 560 and a fifth overview node 580. The semantic information unit 571.4 has a contacts relation 574 which applies between the fourth overview node 570 and a sixth overview node 590.

The fifth overview node 580 and the six overview node 590 of type "GD", i.e. grid or grid element. In accordance with the first overview node 520 in FIG. 4, which describes the totality of the automation functions specifically available for the room 1, the totality of the automation functions specifically available for the first grid element 562 is listed in the fifth overview node 580, and the totality of the automation functions specifically available for the second grid element 561 in the sixth overview node 590. Semantic information relating to the first grid element 562 is stored in the overview list 581 in the fifth overview node 589. Correspondingly semantic information relating to the second grid element 561 is stored in the overview list 51 in the sixth overview node 590.

The structure and the method of operation which are made possible by the overview nodes (also referred to as the view node objects), overview lists (also referred to as the view node item list), relations and functional units in particular produce the following advantages in the engineering, commissioning and maintenance phases: Nodes are able to be copied during engineering, relations are able to be checked with the aid of suitable identifiers by an engineering tool or at runtime automatically, field devices, grids and scope of the available functionality of building sections are able to be changed without modifications having to be made to the program code of open-loop and/or closed-loop control programs since the closed-loop and or open-loop control programs access field devices directly via overview nodes.

Overview nodes or view node objects can also be configured in accordance with the present invention to be linked to a specific group master object 160 or group member object 170 to perform common data exchange of a group of BA objects for group communication from a building automation device (e.g., 106a) hosting the group master object 160 to the corresponding member building automation devices (e.g., 106b, 106c, 108a-108e) hosting a group member object 170 having the same group category identifier and the same group number identifier as the group master object 160.

Figure 3:
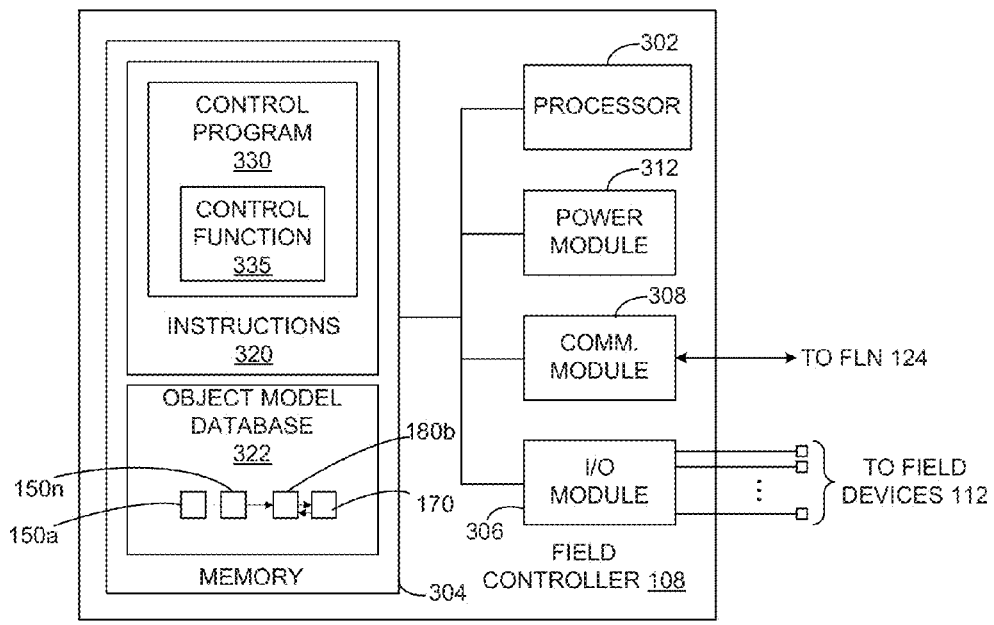
FIG. 3 illustrates an internal block diagram of an exemplary one of the sub-controllers of the building automation system in FIG. 1 in accordance with disclosed embodiments.
Figure 6:
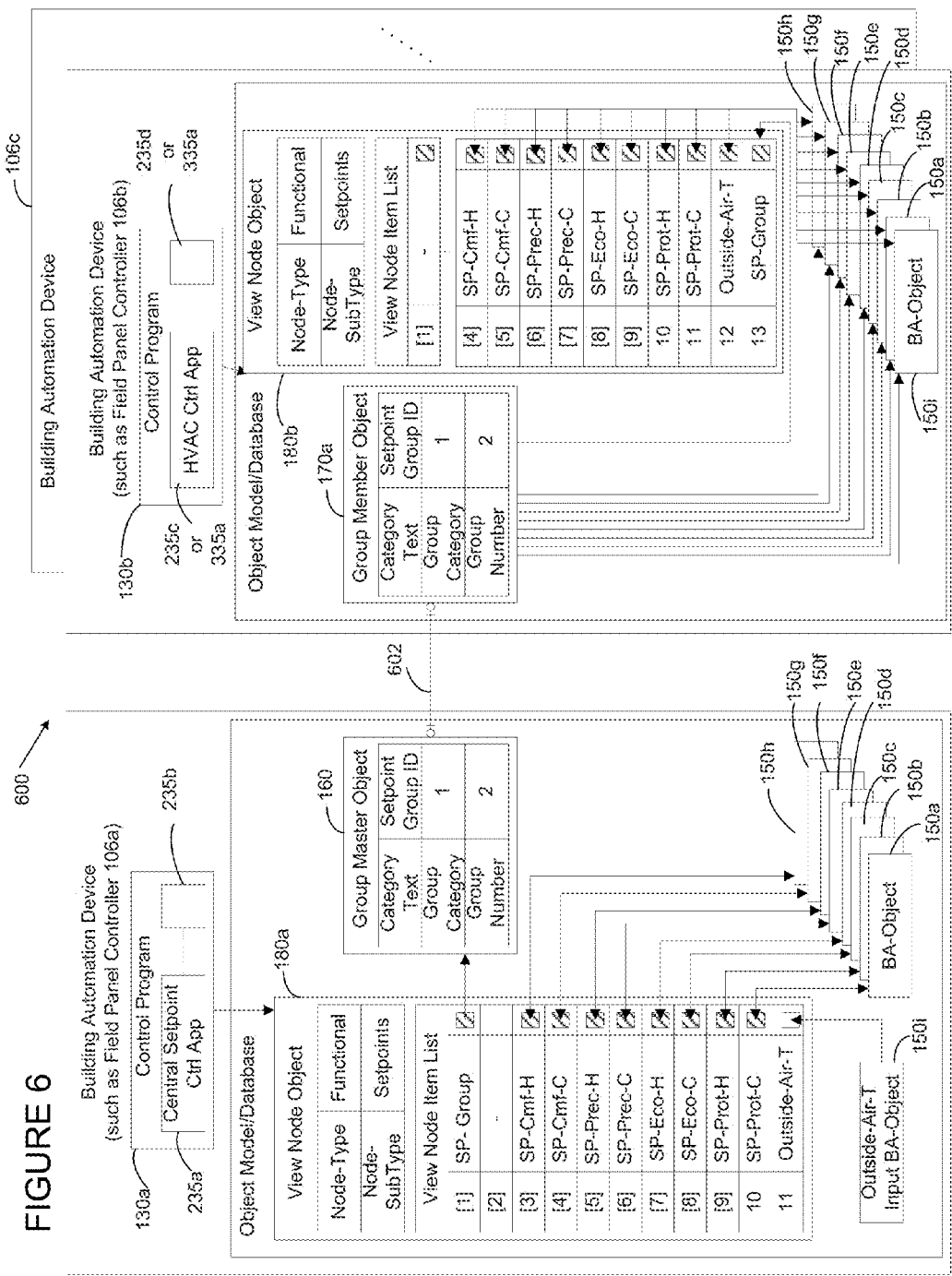
FIG. 6 illustrates a block diagram of another embodiment of a structure of the building automation system in FIG. 1, in which a group master object is employed by one building automation device to control communication with build automation objects assigned to the group master object to and from one or more other building automation devices having a group member object associated with the group master object.

FIG. 6 illustrates a block diagram of an embodiment of a structure 600 of the building automation system 100 for facilitating common group data exchange for a central control function between building automation devices required to collectively implement or support the central control function. As shown in FIG. 6, a group master object 160 is employed by one building automation device (e.g., 106a) to control communication with build automation (BA) objects 150a-150h assigned to the group master object 160 and with one or more other building automation devices such as 106b and 106c having a group member object 170a and 170b associated with the group master object 160. In this particular embodiment shown in FIG. 6, a central setpoint control function or application 235a is employed or implemented by the control program 130 (which is consistent with control program 230 in FIG. 2) of a first building automation device such as field panel 106a. In this embodiment, the central setpoint control function 235a adjusts setpoints based on the outside air temperature (represented by Outside-Air-T Input BA Object 150i) and distributes the common setpoints 150a-150h together with the outside air temperature 150i to an arbitrary set of HVAC subsystem control functions automating & controlling individual rooms such as HVAC control function or application 335a employed or implemented by the control program 130b (which is consistent with the control program 330 in FIG. 3) of a second building automation device such as field panel 106b. The control program 130a-130d of each building automation device 106a-106c and 108a-108e may have more than one central control function 235a-235b or other subsystem control functions 335a-335b that employs a similar grouping mechanism as depicted in FIG. 6 for common group data exchange. Similarly, each building automation device 106a, 106b and 106c may have other objects (e.g., 150j-150n not shown in FIG. 6) that are different than the objects 150a-150i corresponding to receive or exchange the common data.

As shown in FIG. 6, the system 600 is configured to communicate common data for central setpoint control between a plurality of building automation devices 106a and 106b, 106c across a network (e.g., 122 or 124 as represented by the group distribution relation 602). The common data is associated with one or more building automation objects 150a-150i representing points associated with a plurality of field devices controlled or monitored in a building by the building automation devices 106a-106c. To implement the grouping mechanism for the central control function (e.g., central setpoint control), the system 600 includes a first building automation device 106a that includes the first control program 130a having the central setpoint control function 235a. The system 600 also includes a first view node object 180a operatively connected to the first control program 130a and a group master object 160 operatively connected to the first view node object 180a. The first view node object 180a has a first list (also referenced as "view node item list") that includes a list of a plurality of semantic information units or BA Object identifiers (corresponding to the setpoint identifiers represented as item index [3] through item index 10 in FIG. 6 and outside-air-temp identifier represented by item index 11). Each of the semantic information units in the first list identifies and is linked to a corresponding one of a group of the building automation objects 150a-150n that represent and store the setpoints corresponding to the BA Object identifiers. In addition, the first list or view node item list of the view node object 180*a* includes a semantic information group identifier ("SP-Group") corresponding to and defining a group relation with the group master object 160.

In the embodiment shown in FIG. 6, the group master object 160 includes a group category text identifier (e.g., "setpoint group ID" in FIG. 6), a group category identifier (e.g., set at "1" in FIG. 6), and a group number (e.g., set at "2" in FIG. 6). The group category text identifier provides a text reference for displaying the purpose of the group category corresponding to the associated group category identifier.

A second building automation device 106*b* includes a second control program 130*b* that has or implements an HVAC subsystem control function or application 335*a* that relies on setpoints provided by the central setpoint control function 235*a*. Accordingly, the HVAC subsystem control function 335*a* benefits from being identified as a member of the group for receiving such common group data setpoints from the group master object 160 via the group member object 170*a* and the view node object 180*b*. Accordingly, the second view node object 180*b* is operatively connected to the HVAC subsystem control function 335*a* of the second control program 130*b*. The group member object 170*a* is operatively connected to the second view node object 180*b*. The group member object 170*a* has the same group category text identifier, the same group category identifier, and the same group number as the group master object. In operation, the group master object 160 is operatively configured to exchange common data corresponding to the group of the building automation objects 150*a*-150*i* to each of the building automation devices 106*b* and 106*c* having a group member object 170*a* and 170*b*, for example, that has the same group category identifier and, if required to further differentiate groups, the same group number as the group master object 160. As previously noted, rather than have a link to the view node object 180*a* for obtaining the BA Object identifiers for a group associated with the a central control function or program 130*a*, the group master object 160 may have the same or corresponding list of a plurality of semantic information units or BA Object identifiers as the view node object 180*a* (e.g, corresponding to the setpoint identifiers represented as item index [3] through item index 10 in FIG. 6 and outside-air-temp identifier represented by item index 11) for group communication or common data exchange with group member objects 170*a*-170*b* hosted on other devices 106*b*-106*c* or 108*a*-108*d* in the system 100 that have the same group category and/or group number to implement the common control function or program 130*a*.

In addition to the grouping structure for group communication of central setpoint control depicted in FIG. 6, Appendix A provides additional figures and corresponding description for similar system structures and group communication methods for implementing other central control functions in the building automation system 100, such as "central occupancy control functions", "central supply chain-oriented coordination functions", and "hierarchical organized central control functions."

Figure 7:
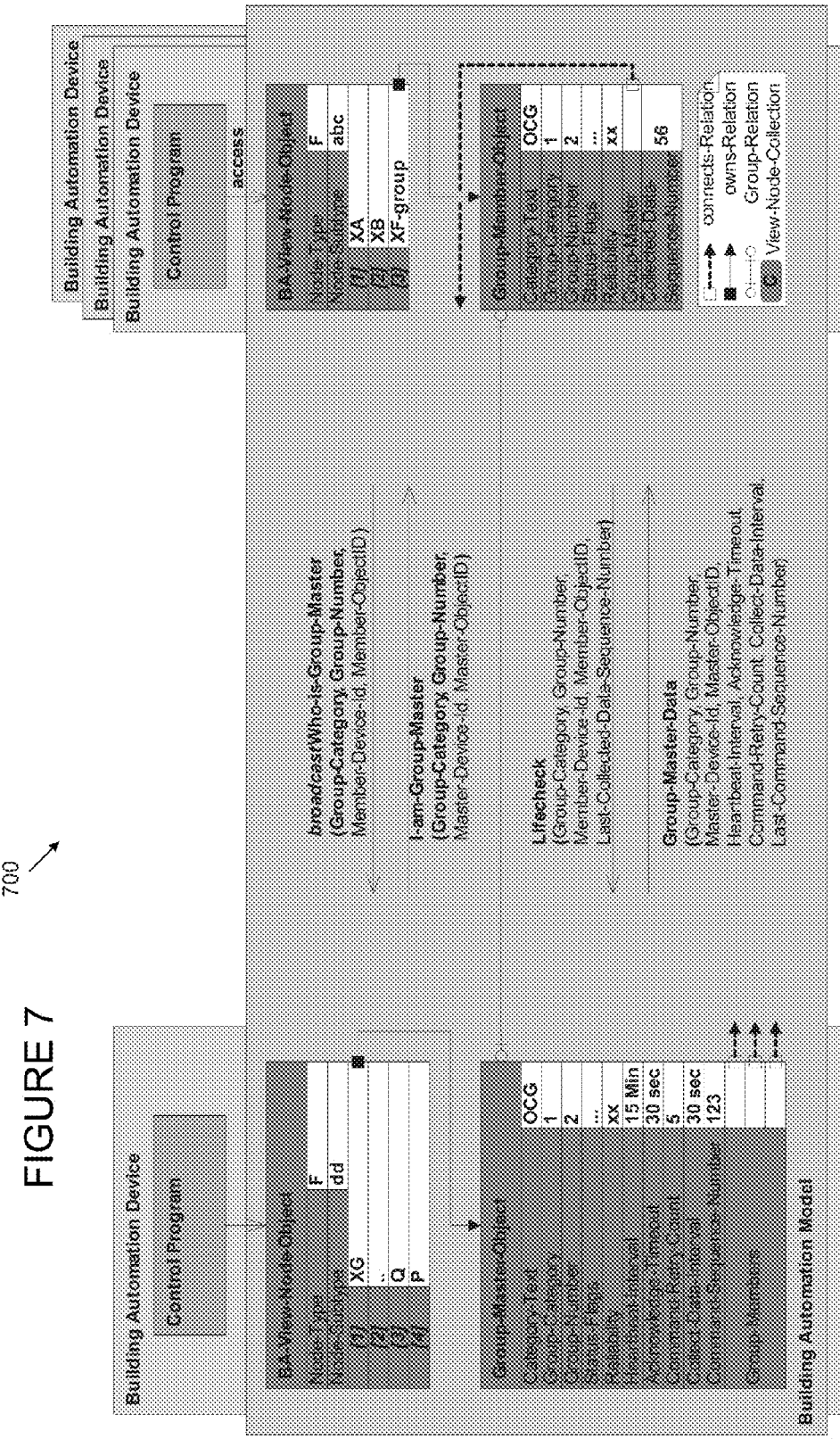
FIG. 7 illustrates a block diagram of another embodiment of a structure of the building automation system in FIG. 1, depicting details, properties, and process steps for a group member object employed by one building automation device to identify and establish a connection with a group master object employed by another building automation device for supporting subsequent common group data exchange with the group master object.

In another aspect of the present invention shown in FIG. 7 (and further described in Appendix A), before a group member object 170*a*-170*d* identifies a network address associated with the group master object 160 for facilitating common group data exchange, each group member object 170 is operatively configured to broadcast a first message (referenced as a "Who-is-Group-Master" message) on the network 122 or 124. The first message includes the group category identifier and the group number identifier assigned to the respective group member object 170 and represents or reflects a request for any group master object on the network 122 and/or 124 to respond with a second message indicating that the responding group master object is the group master object for the group category identifier and the group number identified in the first message. In the second message, the responding group master object may provide the network address associated with the group master object and a master object ID. As shown in FIG. 7, the group member object 170*a*-170*d* may then store the network address and/or master object ID as a "Group-Master" property of the group member object 170*a*-170*d* for subsequently supporting a connection and/or corresponding relation with the group master object 160.

For example, in the implementation shown in FIG. 7, upon receiving a first message or "Who-is-Group-Master" message from a group member object 170*a*-170*d*, the responding group master object 160 having the group category identifier and group number identifier specified in the first or "Who-is-Group-Master" message subsequently stores a reference to the group member object 170*a*-170*d* in a list of corresponding "Group Members".

Continuing with FIG. 7, after identifying a network address and/or master object ID associated with the group master object 160, the group member object 170*a* and 170*b* is operatively configured to periodically transmit a third message (represented as a "Lifecheck" message in FIG. 7) on the network to the group master object 160 requesting a response indicating that the group master object is still active. Upon receiving the third of "Lifecheck" message, the group master object 160 transmits a reply message on the network 122 and/or 124 to each group member object providing a heartbeat interval reflecting a time between common data broadcasts on the network to each group member object having the same group category identifier and the same group number identifier as the group member object. As shown in FIG. 7, the group master object is operatively configured to determine whether the group member object has transmitted the third message to the group master object within a pre-determined heartbeat interval and, if it is determined that the group member has not transmitted the third message to the group master object within the pre-determined heartbeat interval, the group member object 160 removes the reference or identification of the group member object from the group members list stored by the group member object for identifying each group member object for broadcasting common group data.

Figure 8:
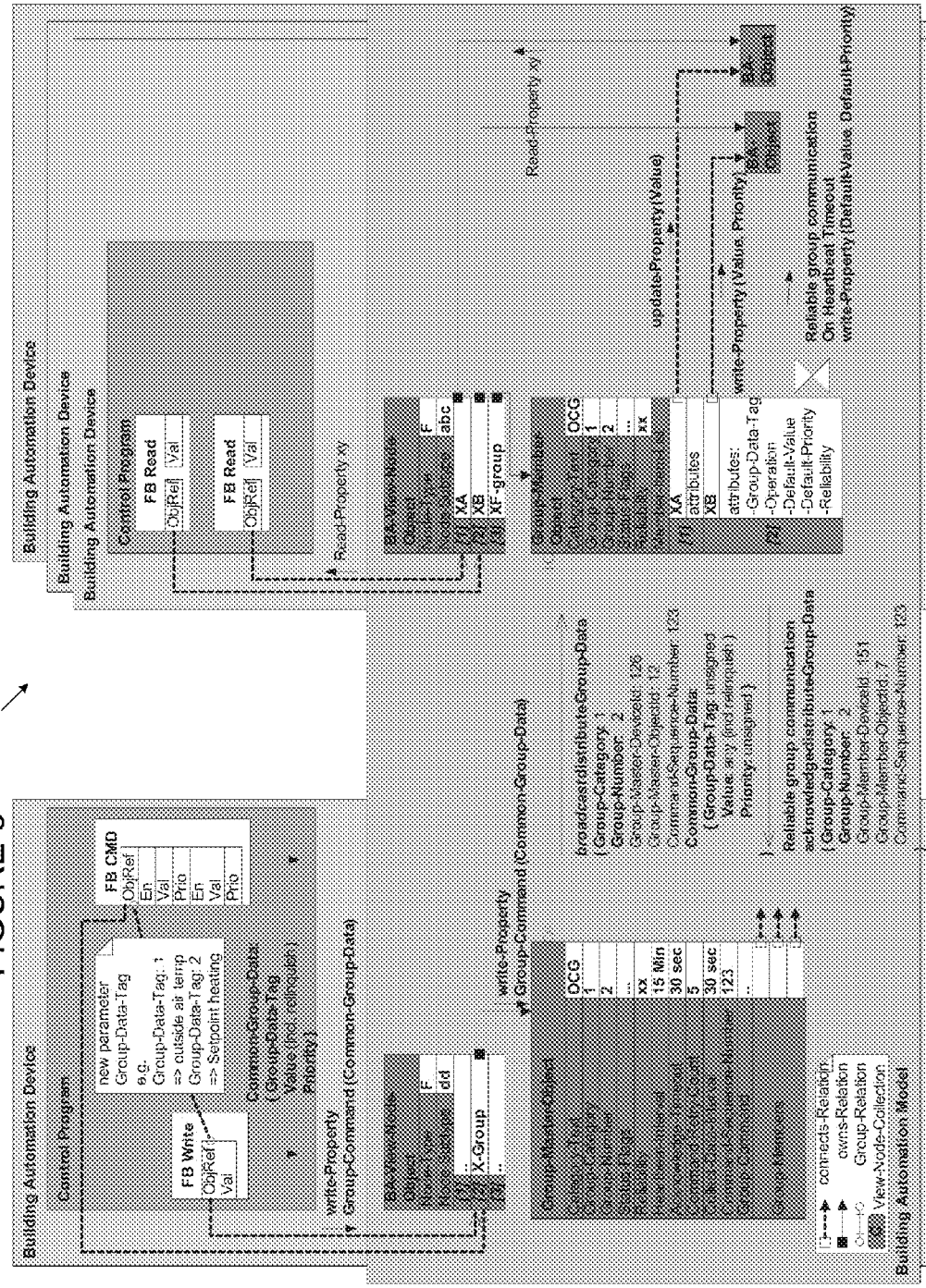
FIG. 8 is a block diagram of another embodiment of a structure of the building automation system in FIG. 1, depicting details, properties, and process steps for a central control program, a view node object, and a group master object employed by one building automation device to control distributing group data to a corresponding group member object, view node object and subsystem control program employed by other building automation devices.

FIG. 8 is a block diagram of another embodiment of a structure 800 of the building automation system 100, depicting details, properties, and process steps for a central control program, a view node object, and a group master object employed by one building automation device to control distributing group data to a corresponding group member object, view node object and subsystem control program employed by other building automation devices. As shown in FIG. 8, the group member object has a member item list that includes one or more of the semantic information units (represented as "XA" and "XB" in FIG. 8) each corresponding to a respective one of the group of building automation objects or BA objects. The member item list further includes a plurality of attributes assigned to each of the semantic information units. A first of the plurality of attributes is a group data tag that identifies the purpose and usage of a common data value of the respective one of the group of building automation objects of the corresponding semantic information unit. A second of the plurality of attributes is an operation property that identifies one of a write, read and update command to be performed by the group member object on the respective one of the group of building automation objects of the corresponding semantic information unit. When common data for the group of building automation devices is received by the group member object from the group master object and the operation property for a respective one of the group of building automation objects is a write command, the group member object writes the common data value of the respective one of the group building automation objects to a counterpart building automation object stored by another building automation device under the control of the second building automation device. When common data for the group of building automation devices is received by the group member object from the group master object and the operation property for a respective one of the group of building automation objects is an update command, the group member object writes the common data value of the respective one of the group building automation objects to a counterpart building automation object stored locally by the second building automation device.

Figure 9:
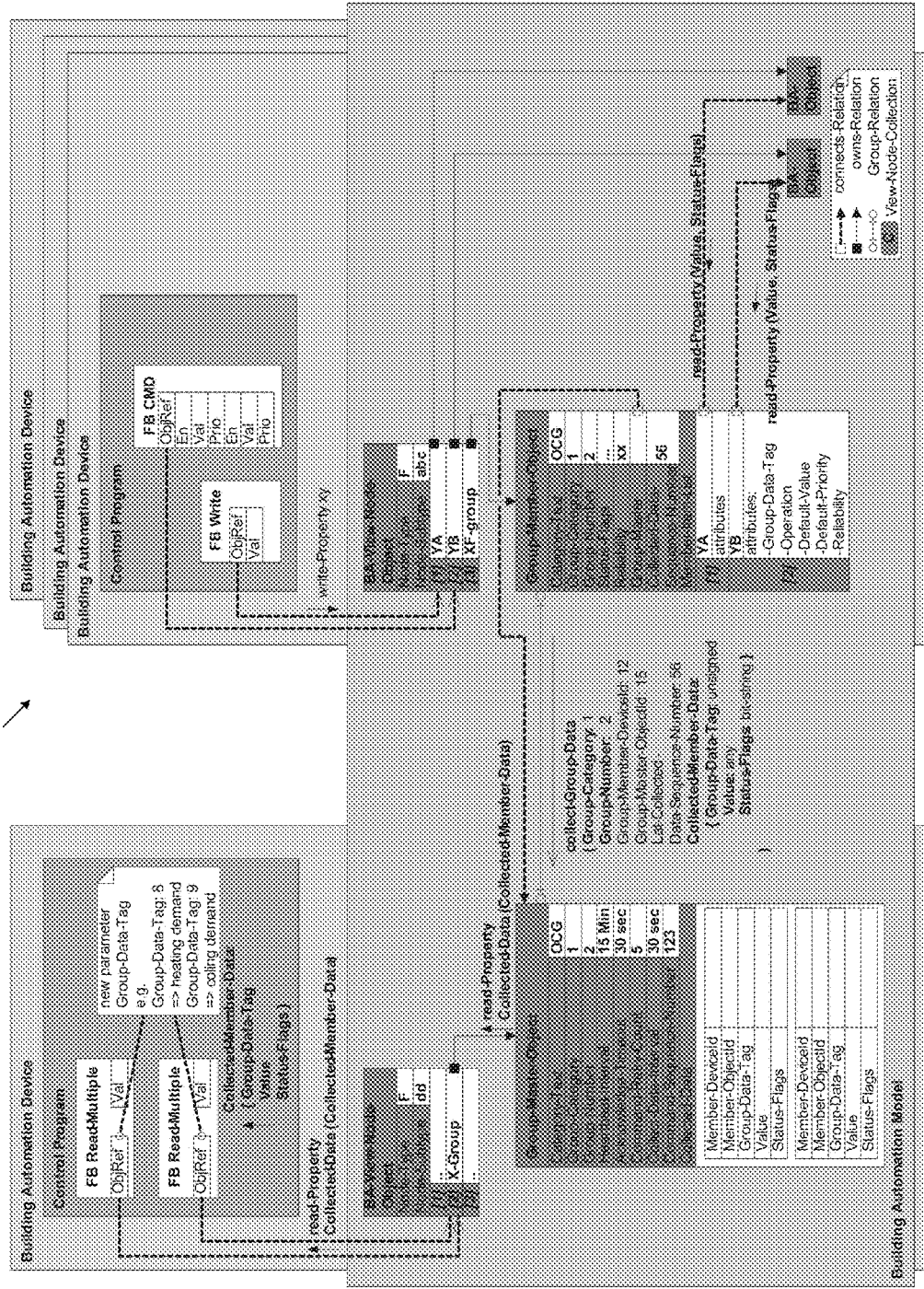
FIG. 9 is a block diagram of another embodiment of a structure of the building automation system in FIG. 1, depicting details, properties, and process steps for a central control program, a view node object, and a group master object employed by one building automation device to control collecting and evaluating group member data received from a corresponding group member object in cooperation with the view node object and subsystem control program employed by another building automation device; and Appendix A is an overview and description document titled "Grouping and Group Communication" that discusses in detail a building automation system including building automation devices (such as field panel or controllers) implemented in connection with the embodiments disclosed herein for grouping of building automation objects and for group communication of common data values associated with such objects between the building automation devices, as well as description of other features that may be implemented in the defined building automation system of FIG. 1.

FIG. 9 is a block diagram of another embodiment of a structure of the building automation system in FIG. 1, depicting details, properties, and process steps for a central control program, a view node object, and a group master object employed by one building automation device to control collecting and evaluating group member data received from a corresponding group member object in cooperation with the view node object and subsystem control program employed by another building automation device. As shown in FIG. 9, when a group member object has an operation property for a respective one of the group of building automation objects that specifies a read command, the group member object periodically reads the value of the respective one of the group building automation objects stored locally on the second building automation device or stored by another building automation device under the control of the second building automation device, and transmits the value to the corresponding group master object upon one of a change in the value or upon a predetermined interval.

The Appendix A attached hereto provides additional illustration of the above described features for grouping of building automation objects for group communication between building automation devices, as well as other features that may be implemented in the defined building automation system 100.

It will be appreciated that the above-described embodiments are merely exemplary, and that those of ordinary skill in the art may readily devise their own implementations and modifications that incorporate the principles of the present invention and fall within the spirit and scope thereof.

We claim:

1. A system for communicating common data between a plurality of building automation devices across a network, the common data corresponding to a group of one or more building automation objects representing points associated with a plurality of field devices controlled or monitored in a building by the plurality of building automation devices, the system comprising:
    a first of the plurality of building automation devices including a first control program and a group master object having a group identifier and configured to receive a command from the first control program;
    a second of the plurality of building automation devices including a second control program, and a first group member object having the same group identifier as the group master object; and
    a third of the plurality of building automation devices including a third control program, and a second group member object having the same group identifier as the group master object,
    wherein, in response to receiving the command from the first control program, the group master object is configured to exchange the common data corresponding to the group of the building automation objects with each of the building automation devices of the plurality of building automation devices where the first and second group member objects have the same group identifier as the group master object, the exchange using the group identifier.

2. The system of claim 1, wherein the group identifier is a group category identifier, the group master object further has a group number identifier, and the group master object is configured to exchange the common data corresponding to the group of the building automation objects with each of the plurality of building automation devices where the first and second group member objects have the same group category identifier and the same group number identifier as the group master object.

3. The system of claim 2, wherein, before identifying a network address associated with the group master object, at least the first group member object is configured to broadcast a first message on the network that includes the group category identifier and the group number identifier and reflects a request for any group master object to respond with a second message indicating that the responding group master object is the group master object for the group category identifier and the group number identified in the first message and providing the network address associated with the group master object.

4. The system of claim 2, wherein, after identifying a network address associated with the group master object, at least the first group member object is configured to periodically transmit a third message on the network to the group master object requesting a response indicating that the group master object is still active.

5. The system of claim 4, wherein, upon receiving the third message, the group master object transmits a reply message on the network to the first group member object providing a heartbeat interval reflecting a time between common data broadcasts on the network to each group member object having the same group category identifier and the same group number identifier as the group member object.

6. The system of claim 4, wherein, the group master object is configured to determine whether the first group member object has transmitted the third message to the group master object within a pre-determined heartbeat interval and, if it is determined that the first group member object has not transmitted the third message to the group master object within the pre-determined heartbeat interval, the first group member object removes an identification of the first group member object from a member list stored by the first group member object for identifying each group member object to broadcast common data.

7. The system of claim 1, wherein the first group member object has a member item list that includes one or more of semantic information units each corresponding to a respective one of the group of building automation objects, the member item list further including a plurality of attributes assigned to each of the semantic information units, a first of the plurality of attributes is a group data tag that identifies the purpose and usage of a common data value of the respective one of the group of building automation objects of the corresponding semantic information unit.

8. The system of claim 7, wherein a second of the plurality of attributes is an operation property that identifies one of a write, read and update command to be performed by the first group member object on the respective one of the group of building automation objects of the corresponding semantic information unit.

9. The system of claim 8, when the common data for the group of building automation objects is received by the first group member object from the group master object and the operation property for a respective one of the group of building automation objects is a write command, the first group member object writes the common data value of the respective one of the group building automation objects to a counterpart building automation object stored by another building automation device under the control of the second building automation device.

10. The system of claim 8, when the common data for the group of building automation objects is received by the first group member object from the group master object and the operation property for a respective one of the group of building automation objects is an update command, the first group member object writes the common data value of the respective one of the group building automation objects to a counterpart building automation object stored locally by the second building automation device.

11. The system of claim 8, when the operation property for a respective one of the group of building automation objects is a read command, the first group member object periodically reads the value of the respective one of the group building automation objects stored locally on the second building automation device or stored by another building automation device under the control of the second building automation device, and transmits the value to the group master object upon one of a change in the value and upon a predetermined interval.

12. The system of claim 1, wherein the first of the building automation devices further includes a first view node object connected between the first control program and the group master object, the first view node object having a first list of a plurality of semantic information units, each of the semantic information units in the first list identifies and is linked to a corresponding one of the group of the building automation objects.

13. A method for communicating common data between a plurality of building automation devices across a network, the common data being associated with a group of one or more building automation objects representing points associated with a plurality of field devices controlled or monitored in a building by the plurality of building automation devices, the method comprising:
providing, in a first of the plurality of building automation devices, a first control program, and a group master object having a group identifier;
providing, in a second of the plurality of building automation devices, a second control program, and a first group member object having the same group identifier as the group master object
providing, in a third of the plurality of building automation devices, a third control program, and a second group member object having the same group identifier as the group master object; and
providing, via the first control program, a write group command to the group master object to prompt the group master object to exchange the common data corresponding to the group of building automation objects to each of the plurality of building automation devices, where the first and second group member objects have the same group identifier as the group master object, the exchange using the group identifier.

14. The method of claim 13, wherein the group identifier is a group category identifier, the group master object further includes a group number identifier and, in response to the step of providing the write command, the group master exchanges the common data corresponding to the group of the building automation objects with each of the plurality of building automation devices where the first and second group member objects have the same group category identifier and the same group number identifier as the group master object.

15. The method of claim 14, further comprising:
broadcasting, via at least the first group member object, a first message on the network that includes the group category identifier and the group number identifier and reflects a request for any group master object to respond with a second message indicating that the responding group master object is the group master object for the group category identifier and the group number identified in the first message.

16. The method of claim 14, further comprising:
transmitting, via the first group member object, a third message on the network to the group master object requesting a response indicating that the group master object is still active.

17. The method of claim 16, further comprising:
in response to receiving the third message, transmitting via the group master object a reply message on the network to the first group member object providing a heartbeat interval reflecting a time between common data broadcasts on the network to each group member object having the same group category identifier and the same group number identifier as the group member object.

18. The method of claim 16, further comprising:
determining whether the first group member object has transmitted the third message to the group master object within a pre-determined heartbeat interval; and,
when it is determined that the first group member object has not transmitted the third message to the group master object within the pre-determined heartbeat interval, removing a reference of the first group member object from a member list stored by the first group member object for identifying each first group member object to broadcast the common data.

19. The method of claim 13, wherein the first group member object has a member item list that includes one or more of semantic information units each corresponding to a respective one of the group of building automation objects, the member item list further including a plurality of attributes assigned to each of the semantic information units, a first of the plurality of attributes is a group data tag that identifies the purpose and usage of a common data value of the respective one of the group of building automation objects of the corresponding semantic information unit.

20. The method of claim 19, wherein a second of the plurality of attributes is an operation property that identifies one of a write, read and update command to be performed by the first group member object on the respective one of the group of building automation objects of the corresponding semantic information unit.

21. The method of claim 20, further comprising:
when the common data for the group of building automation objects is received by the first group member object from the group master object and the operation property for a respective one of the group of building automation objects is a write command, writing via the first group member object the common data value of the respective one of the group building automation objects to a counterpart building automation object stored by another building automation device under the control of the second building automation device.

22. The method of claim 20, further comprising:
when the common data for the group of building automation objects is received by the first group member object from the group master object and the operation property for a respective one of the group of building automation objects is an update command, writing via the first group member object the common data value of the respective one of the group building automation objects to a counterpart building automation object stored locally by the second building automation device.

23. The method of claim 20, further comprising:
when the operation property for a respective one of the group of building automation objects is a read command, reading via the first group member object the value of the respective one of the group building automation objects stored locally on the second building automation device or stored by another building automation device under the control of the second building automation device; and
transmitting the value to the group master object upon one of a change in the value and upon a predetermined interval.

24. The method of claim 13, wherein the first of the building automation devices further includes a first view node object connected between the first control program and the group master object, the first view node object having a first list of a plurality of semantic information units, each of the semantic information units in the first list identifies and is linked to a corresponding one of the group of the building automation objects.

* * * * *